United States Patent
Chinoy et al.

(10) Patent No.: US 8,740,067 B1
(45) Date of Patent: Jun. 3, 2014

(54) SECONDARY VERIFICATION

(75) Inventors: Ammar Chinoy, Seattle, WA (US);
Michael Donikian, Seattle, WA (US);
Ashish Agrawal, Seattle, WA (US);
Amit Bhosle, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/407,904

(22) Filed: Feb. 29, 2012

(51) Int. Cl.
*G06K 5/00* (2006.01)
(52) U.S. Cl.
USPC .......................................... 235/380; 235/375
(58) Field of Classification Search
USPC ................................................ 235/375, 380
See application file for complete search history.

(56) References Cited

U.S. PATENT DOCUMENTS

| | | | |
|---|---|---|---|
| 5,708,422 A * | 1/1998 | Blonder et al. | 340/5.41 |
| 8,020,763 B1 * | 9/2011 | Kowalchyk et al. | 235/380 |
| 8,078,538 B1 * | 12/2011 | Buch et al. | 705/44 |
| 8,127,982 B1 * | 3/2012 | Casey et al. | 235/379 |
| 8,256,667 B2 * | 9/2012 | Poznansky et al. | 235/380 |
| 2003/0182194 A1 * | 9/2003 | Choey et al. | 705/16 |
| 2007/0034685 A1 * | 2/2007 | Botham | 235/380 |
| 2007/0094152 A1 * | 4/2007 | Bauman et al. | 705/67 |
| 2008/0255992 A1 * | 10/2008 | Lin | 705/44 |
| 2008/0308628 A1 * | 12/2008 | Payne et al. | 235/381 |
| 2008/0313062 A1 * | 12/2008 | Williams et al. | 705/30 |
| 2008/0313078 A1 * | 12/2008 | Payne et al. | 705/44 |
| 2009/0187492 A1 * | 7/2009 | Hammad et al. | 705/26 |
| 2011/0174874 A1 * | 7/2011 | Poznansky et al. | 235/379 |
| 2011/0202416 A1 * | 8/2011 | Buer et al. | 705/18 |
| 2012/0153028 A1 * | 6/2012 | Poznansky et al. | 235/492 |

* cited by examiner

*Primary Examiner* — Paultep Savusdiphol
(74) *Attorney, Agent, or Firm* — Thomas|Horstemeyer, LLP

(57) ABSTRACT

Disclosed are various embodiments for implementing secondary verification of user accounts through the use of near field communication devices. A first account code and first verification code are stored in a memory accessible to a computing device, wherein the first account code is associated with a payment instrument. A second account code is received in a charge request from a transaction client. A second verification code is further obtained from a client device. A determination is made as to whether to approve charging of an account based at least on whether the second verification code received in the computing device matches the first verification code.

20 Claims, 5 Drawing Sheets

SECONDARY VERIFICATION

BACKGROUND

Credit card fraud can happen in a variety of ways. Some common forms of credit card fraud include lost credit cards, stolen credit cards, and counterfeit credit cards. Even as technology advances, fraudulent uses of credit card numbers is still a problem.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to implementing secondary verification of transactions involving one or more accounts using near field communication devices. In some embodiments, the verification application may be executed by a computing device such as a server. The computing device includes a memory that stores the account codes used to identify the account numbers associated with one or more payment instruments. The computing device also includes one or more verification codes stored in the memory that are used to verify that a user of a payment instrument is authorized to charge amounts on the payment instrument. As an example, a user of a payment instrument initiates a transaction at a point-of-sale system. For example, a payment instrument may correspond to a credit card, a debit card, a gift card, and/or other payment instruments. The payment instrument is swiped, scanned or otherwise entered at a point-of-sale system. Also, verification code is obtained to be associated with the transaction. The verification code may be obtained, for example, from a near field communication device at the transaction client. A charge request is created and sent to the verification application. A charge request may include, for example, purchase information, cash advance, and/or other transaction description of goods made by a user of the payment instrument.

In one embodiment, the verification application obtains the account code and the verification code from the charge request. Based on whether the verification code is properly associated with the account code, the verification application approves or denies the charging of the account code listed in the charge request. In the following discussion, a general description of the system and its components is provided, followed by a discussion of the operation of the same.

Figure 1:
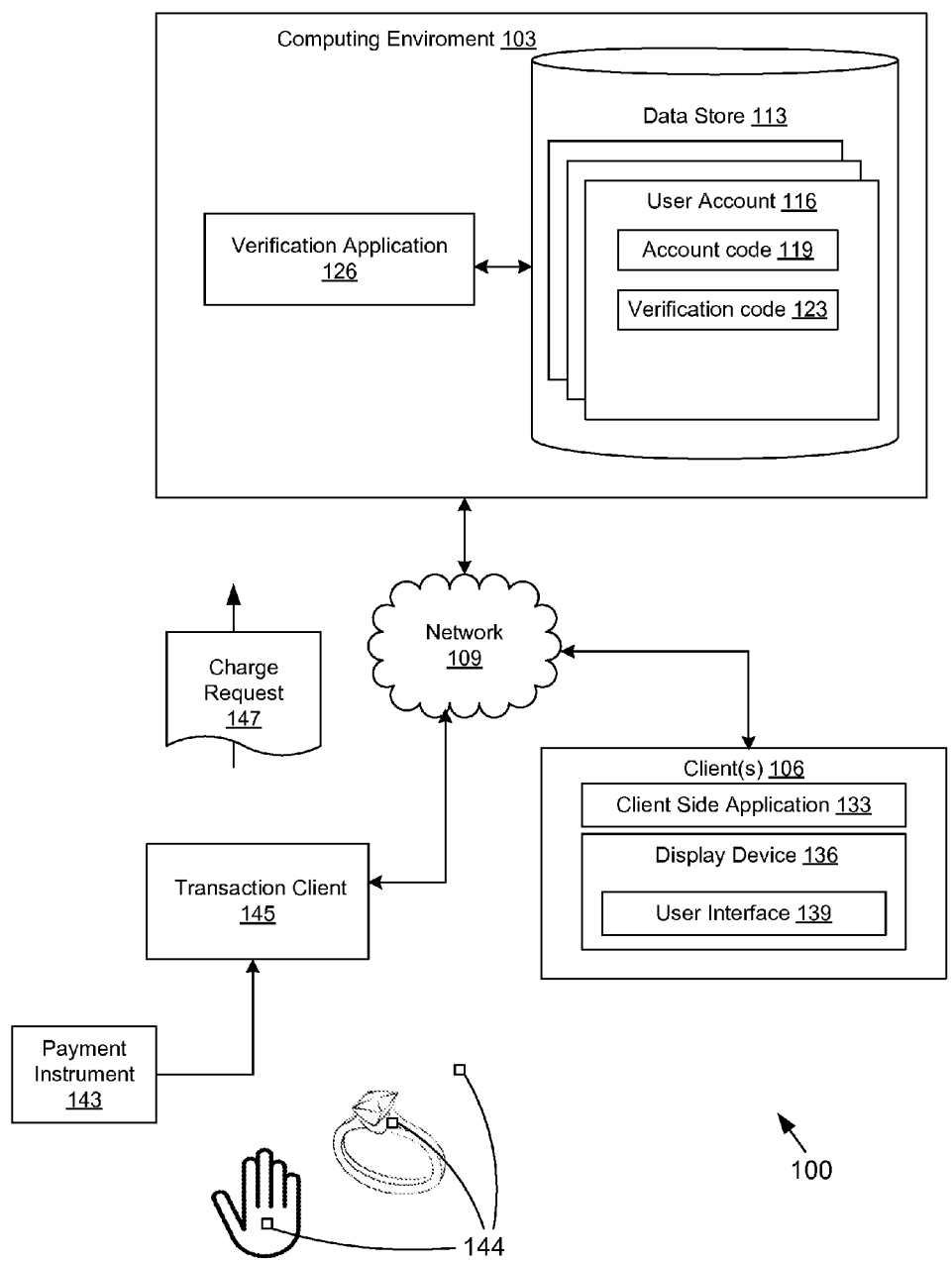
FIG. 1 is a drawing of a networked environment according to various embodiments of the present disclosure.

With reference to FIG. 1, shown is a networked environment 100 according to various embodiments. The networked environment 100 includes computing environment 103 in data communication with one or more clients 106 by way of network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may comprise a plurality of servers or other computing devices that are arranged, for example, in one or more server banks or computer banks or other arrangements. For example, the computing environment 103 may comprise a cloud computing resource, a grid computing resource, and/or any other distributed computing arrangement. The computing environment 103 may be located in a single installation or may be distributed among many different geographical locations.

Various applications and/or other functionality may be executed in the computing environment 103 according to various embodiments. Also, various data is stored in a data store 113 that is accessible to the computing environment 103. The data store 113 may be representative of a plurality of data stores as can be appreciated. The data stored in the data store 113, for example, is associated with the operation of the various applications and/or functional entities described below.

The components executed on the computing environment 103, for example, include verification application 126, and other applications, services, processes, systems, engines, or functionality not discussed in detail herein. The verification application 126 is executed to facilitate secondary verification that charges are to be made to respective accounts using near field communication devices as will be described.

The data stored in the data store 113 includes, for example, user accounts 116 associated with each account 116 is an account code 119, a verification cods 123 and potentially other data. User accounts 116 may include information such as, for example, usernames, passwords, security credentials, authorized applications, and/or other data. Account codes 119 identify the account number to be charged, debited or credited when a purchase, a cash advance, and/or other transaction is made by a user. Verification codes 123 are secondary verification codes associated with account codes 119 used to confirm that a user is an authorized user of a corresponding account code 119.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as a client side application 133 and/or other applications. The client side application 133 may be executed in a client 106, for example, to access and render network pages, such as web pages, or other network content served up by the computing environment 103 and/or other servers. In this respect, the client side application 133 may comprise a browser and/or other applications. In one embodiment, the client side application 133 comprises a plug-in within a browser application. The client 106 may be configured to execute applications beyond client side application 133 such as, for example, email applications, instant message applications, and/or other applications. The verification application 126 may communicate with the client 106 over various protocols such as, for example, hypertext transfer protocol (HTTP), simple object access protocol (SOAP), real-time transport protocol (RTP), real time streaming protocol (RTSP), real time messaging protocol (RTMP), user datagram protocol (UDP), transmission control protocol (TCP), and/or other protocols for communicating data over the network 109. The client side application 133 may generate one or more user interfaces 139 that are rendered on a client 106 in order to enable a user that manipulates such client 106 to interact with verification application 126 as will be described.

The client 106 may include a display device 136 and may include one or more input devices. Such input devices may comprise, for example, devices such as keyboards, mice, joysticks, accelerometers, light guns, game controllers, touch pads, touch sticks, push buttons, optical sensors, microphones, webcams, and/or any other devices that can provide user input.

Payment instrument 143 is associated with a respective one of the account codes 119. For example, account codes 119 may correspond to a credit card account number, a debit card account number, a gift card account number, and/or other account number. In one embodiment, the payment instrument 143 may be used to access different account codes 119 associated with different financial institutions. Alternatively, the payment instrument 143 may be used to access multiple account codes 119 associated with the same financial institution. In some embodiments, the payment instrument 143 includes a near field communication device that embodies the account code 119.

A second near field communication device 144 is used to verify that the holder of the payment instrument 143 is an authorized user of the account code 119. The near field communication device 144 may be configured to be embedded in a person, a ring, a mobile device, a watch, a card, a key, and/or other personal accessory. Alternatively, the near field communication device 144 may be a stand-alone item. The transaction client 145 is used to scan/read both the payment instrument 143 and the near field communication device 144 and generate a charge request 147. The charge request 147 includes the account code 119 from the payment instrument 143 and the verification code 123 from the near field communication device 144. The transaction client 145 may include, for example, a register, a credit card scanner, a credit card reader, radio frequency identification (RFID) scanning system, an electronic commerce system, a point-of-sale system, and/or any other system used in processing transactions involving goods and services. A charge request 147 may include for example, a description of purchases of items, refunds, cash advances, and/or other transactions made by a holder of the payment instrument 143.

Next, a general description of the operation of the various components of the networked environment 100 is provided. To begin, a user employs the payment instrument 143 and the near field communication device 144 at a transaction client 145. To implement a transaction, both the payment instrument 143 and the near field communication device 144 are scanned at the transaction client 145. In one embodiment, the payment instrument 143 may comprise, for example, a credit card, a debit card, a gift card, a radio frequency identification (RFID) device, and/or other instrument used for making transactions. In one embodiment, the payment instrument 143 may include a first near field communication device that can be scanned by the transaction client 145. Once the transaction client 145 has scanned both the payment instrument 143 and the near field communication device 144, the transaction client 145 generates a charge request 147 that contains information relating to both the payment instrument 143 and the near field communication device 144. Specifically, the charge request 147 includes the account code 119 from the payment instrument 143, and the verification code 123 from the near field communication device 144. The charge request 147 may include information that indicates or describes a purchase, a cash advance, a refund, and/or any other transaction. The transaction client 145 facilitates sending the charge request 147 to the verification application 126 over the network 109.

The verification application 126 access the account code 119 and the verification code listed in the charge request 147. Once the account code 119 and the verification code 123 have been identified, the verification application 126 determines whether these two codes match to the previously stored account code 119 and verification code 123 stored in the data store 113 in association with the respective user account 116 of the charging user. Assuming that both codes 119 and 123 obtained at the transaction client 145 match the counterpart codes 119/123 saved in the data store 113 in association with the respective user account 116, the verification application 126 approves charging of the user account 116 associated with the charge request 147. Otherwise, the charge request 147 is denied. Thus, by requiring that the verification code 123 generated at the transaction client 145 match the verification code 123 stored in the data store 113 in order to approve a transaction, the verification application 126 advantageously prevents use of the payment instrument 143 without the near field communication device 144. This provides for a greater degree of security to prevent fraudulent use of payment instruments 143.

As a non-limiting example, the near field communication device may be embedded in a ring or other personal item that can be waved at a transaction client 145 to provide the verification code 123 to the transaction client 145 to be included in the charge request 147 sent to the verification application 126 to complete transactions associated with payment instrument 143.

In another embodiment, a holder of the payment instrument 143 wishes to complete a transaction using the payment instrument 143. To do so, the user may scan the payment instrument 143 at a transaction client 145. The transaction client 145 generates a charge request 147 that is sent to the verification application 126. The verification application 126 identifies the respective user account 116 based on the account code 119 in the charge request 147 that is associated with the payment instrument 143. The verification application 126 sends an electronic message that comprises a request to verify the transaction to the client 106. For example, the electronic message may include an email message, a short messaging service (SMS) text message, a voicemail message, and/or any other form of an electronic message.

Upon viewing the request at the client 106, a user employing the client 106 may be required to enter the verification code 123 into the client 106 that is sent to the verification application 126. Once the verification application 126 receives the verification code 123 from the client 106, the verification application 126 approves the charge request 147 and facilitates charging the respective account code 119 listed in the charge request 147 if the verification code 123 matches the previously stored verification code 123 associated with the respective user account 116. Accordingly, verification codes 123 may be used to complete transactions made with the payment instrument 143 such as paying bills, checking account balances, transferring funds, or performing a variety of other account transactions. The entering of verification codes 123 by the user into the client 106 to obtain approval of a transaction provides for greater security and prevents fraudulent use of the payment instrument 143.

Figure 2A:
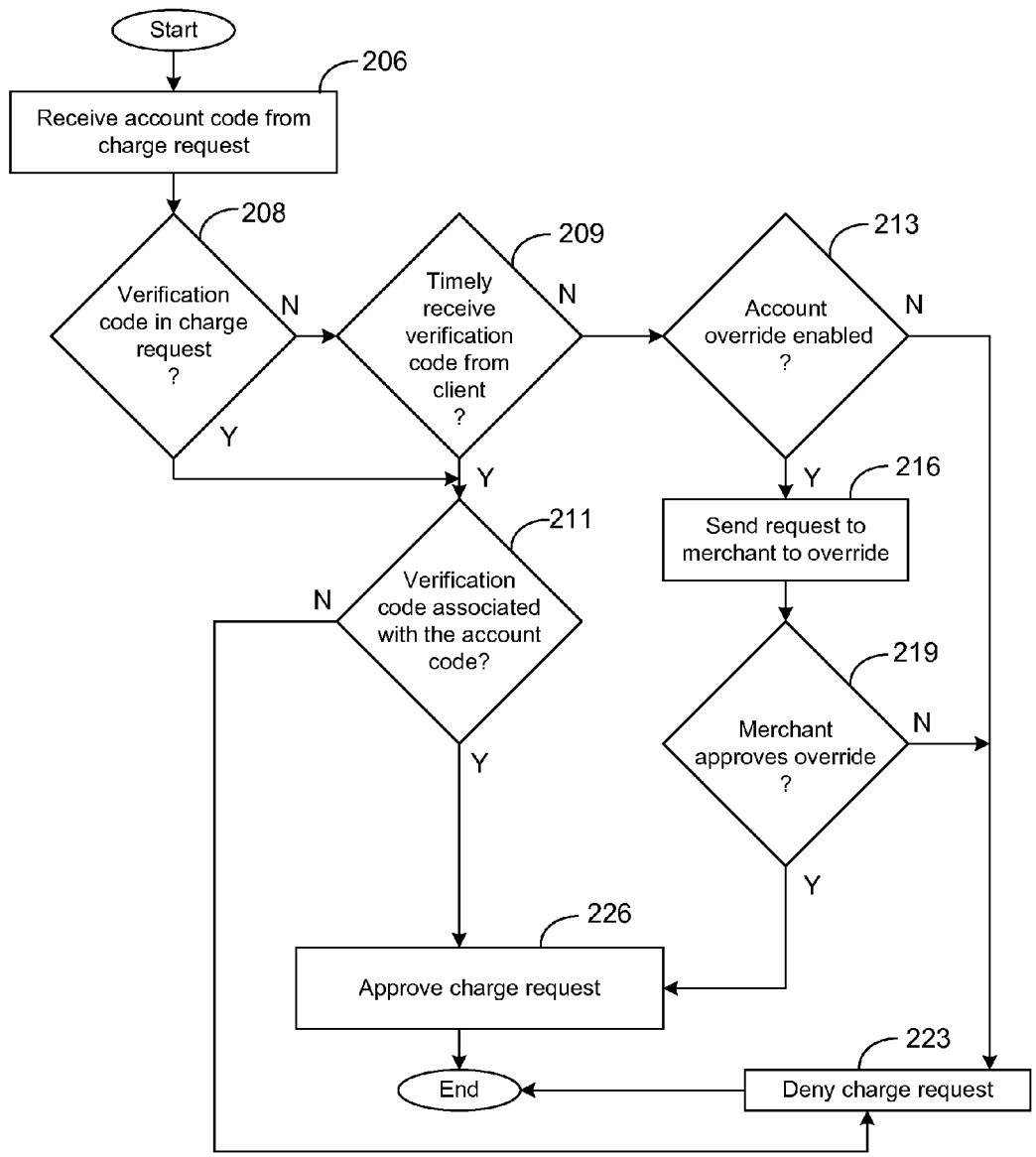
FIGS. 2A-2C are flowcharts illustrating examples of functionality implemented as portions of verification application executed in a computing environment in the networked environment of FIG. 1 according to various embodiments of the present disclosure.

Referring next to FIG. 2A, shown is a flowchart that provides one example of the operation of a portion of the verification application 126 (FIG. 1) denoted herein as verification application 126a, used to implement secondary verification of user accounts through the use of near field communication devices 144 (FIG. 1) according to various embodiments. It is understood that the flowchart of FIG. 2A provides merely an example of the many different types of functional arrangements that may be employed to implement the operation of the portion of the verification application 126a as described herein. As an alternative, the flowchart of FIG. 2A may be viewed as depicting an example of steps of a method implemented in the computing environment 103 (FIG. 1) according to one or more embodiments.

To begin, it is assumed that a user scans the payment instrument 143 (FIG. 1) to use for purchases and other transactions at a transaction client 145 (FIG. 1). The user also waves the near field communication device 144 near the transaction client 145. In one embodiment, the payment instrument 143 may include a near field communication device 144. In another embodiment, both the payment instrument 143 and the near field communication device 144 are scanned at the same location. For example, the payment instrument 143 may be a credit card, debit card, gift card, and/or other card. The near field communication device 144 may be embedded on a card, implanted in a person, embedded in a ring, embedded in a mobile device, and/or embedded in other accessories. Next, the transaction client 145 generates a charge request 147 (FIG. 1) and sends the charge request 147 to the verification application 126a by way of network 109 (FIG. 1).

In box 206, upon receipt of the charge request 147, the verification application 126a identifies the account code 119 (FIG. 1) associated with the payment instrument 143. The verification application 126a then proceeds to box 208. In box 208, the verification application 126a determines if the verification code 123 is listed in the charge request 147. Assuming the verification code 123 is included in the charge request 147, the verification application 126a proceeds to box 211. Otherwise, the verification application 126a proceeds to box 209.

Assuming the verification code 123 is listed in the charge request 147, the verification application 126a proceeds to box 211, and confirms that the verification code 123 and the account code 119 obtained from the user at the transaction client 145 match the verification code 123 and account code 119 previously stored in association with the respective user account 116. Assuming that a proper match is detected, the verification application 126a proceeds to box 226 and sends approval to charge the user account 116. Otherwise, the verification application 126a moves to box 223 in which the verification application 126a denies charging the user account 116 associated with the payment instrument 143. Thereafter, the verification application 126a ends.

Assuming the verification code 123 is not listed in the charge request 147, the verification application 126a proceeds to box 209 to wait for the verification code 123 to be received from the transaction client 145 or client device. In this respect, the verification code 123 is sent separately from the charge request 147. If a predefined amount of time elapses (e.g. a timeout occurs) before the verification code 123 is separately received, the verification application 126a proceeds to box 213. For example, a predefined amount of time may range from a few seconds to several minutes or other time period. Otherwise, the verification application 126a proceeds to box 211 described above.

In box 213, the verification application 126a determines whether the user has enabled a possible secondary verification override. For example, secondary verification override allows a merchant to remove the requirement of a verification code 123 for approving charge requests 147, thereby permitting the verification application 126a to approve charge requests 147 without receipt of the verification code 123. If secondary verification override has not been enabled, the verification application 126a proceeds to box 223 and denies the charge request 147.

Assuming that secondary verification override is enabled, the verification application 126a moves to box 213 and sends a request to a merchant to approve the secondary verification override request. If the merchant employing a transaction client 145 or other device approves the secondary verification override request, the verification application 126a moves to box 226 and approves the charge request 147. For example, a merchant may determine that the level of risk associated with completing the transaction is acceptable given the past experiences with the holder of the payment instrument 143. For example, the merchant may have knowledge of the payment history of the holder of the payment instrument 143. As another example, the holder of the payment instrument 143 may be a frequent customer of the merchant. Assuming the merchant does not approve the secondary verification override request, the verification application 126a proceeds to box 223 and denies the charge request 147. Thereafter the verification application 126a ends.

Figure 2B:
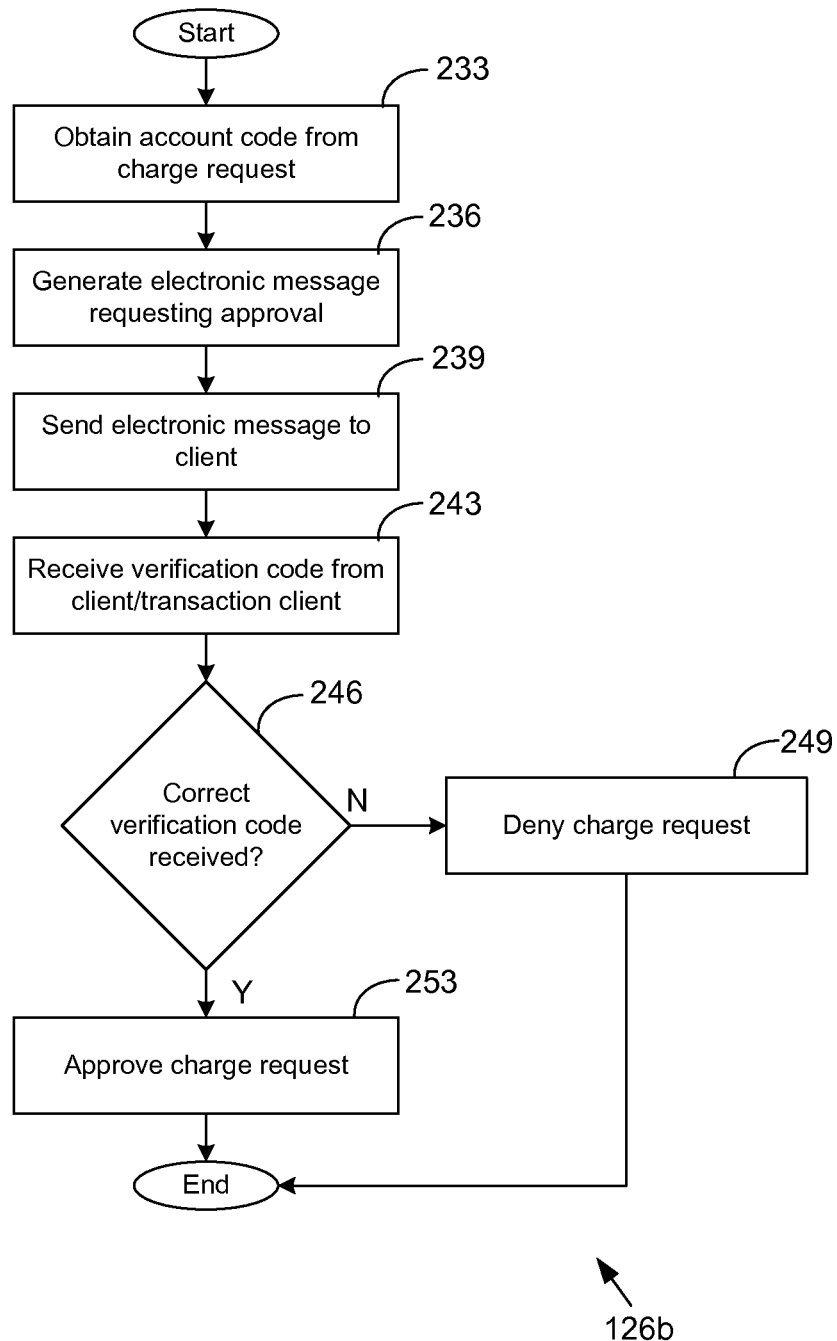

Referring next to FIG. 2B, shown is a flowchart that provides another example of the operation of a portion of the verification application 126 (FIG. 1) denoted herein as verification application 126b used to implement secondary verification of user accounts according to various embodiments. It is understood that the flowchart of FIG. 2B provides merely an example of the many different types of functional arrangements that may be employed to implement the operation of the portion of the verification application 126b as described herein. As an alternative, the flowchart of FIG. 2B may be viewed as depicting an example of steps of a method implemented in the computing environment 103 (FIG. 1) according to one or more embodiments.

It is assumed that a holder of the payment instrument 143 (FIG. 1) scans, swipes, or otherwise enters the payment instrument 143 at a transaction client 145 (FIG. 1). The transaction client 145 generates a charge request 147 (FIG. 1) and sends the charge request 147 to the verification application 126b.

In box 233, the verification application 126b obtains the account code 119 (FIG. 1) associated with the payment instrument 143 from the charge request 147. Next, the verification application 126b moves to box 236 and generates an electronic message requesting approval of the transaction. The electronic message may comprise an email message, a short messaging service (SMS) text message, a voicemail message, and/or any other form of an electronic message. The verification application 126b then proceeds to box 239 and sends the electronic message to the client 106 (FIG. 1) associated with the user account 116 (FIG. 1) indicated by the account code 119 obtained from the charge request 147. In this embodiment, the client 106 may include a mobile device such as, for example, a smartphone, a table computer, a cellular telephone, and/or any other mobile device that a person authorized to use the payment instrument 143 may preferably keep on hand at all times.

The verification application 126b then moves to box 243 and receives the verification code 123 (FIG. 1) input by the user in the client 106 or the transaction client 145. The verification application 126b then proceeds to box 246 and determines whether the verification code 123 received from either the client 106 or the transaction client 145 matches the previously stored verification code 123 in the data store 113 (FIG. 1) associated with the respective user account 116. Assuming the correct verification code 123 is received, the verification application 126b proceeds to box 253 and approves charging of the user account 116. Otherwise, the verification application 126b moves to box 249 and denies charging the user account 116 associated with the payment instrument 143. Thereafter, the verification application 126b ends.

Figure 2C:
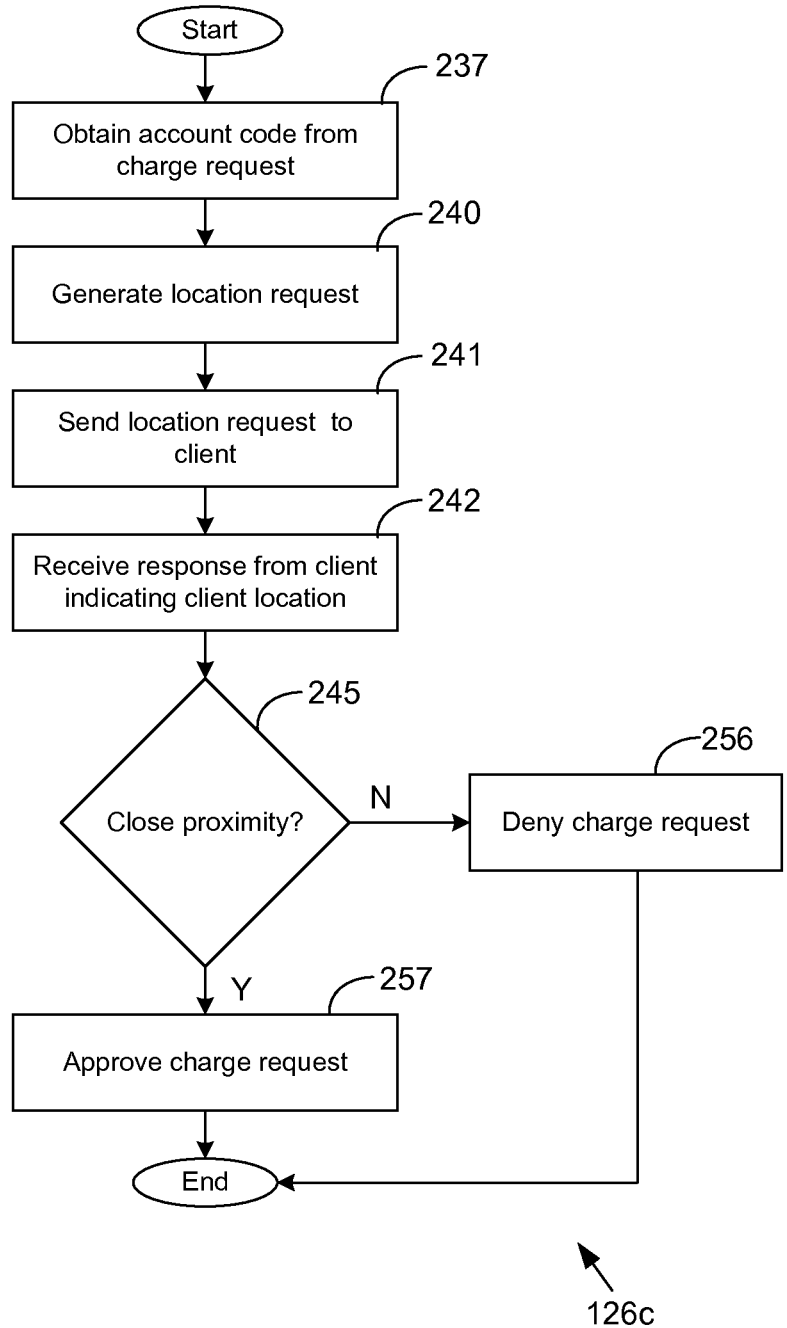

Turning now to FIG. 2C, shown is a flowchart that provides yet another example of the operation of a portion of the verification application 126 (FIG. 1) denoted herein as verification application 126c used to implement secondary verification of user accounts according to various embodiments. It is understood that the flowchart of FIG. 2C provides merely an example of the many different types of functional arrangements that may be employed to implement the operation of the portion of the verification application 126c as described herein. As an alternative, the flowchart of FIG. 2C may be viewed as depicting an example of steps of a method implemented in the computing environment 103 (FIG. 1) according to one or more embodiments.

Once again, it is assumed that a holder of the payment instrument 143 (FIG. 1) scans, swipes, or otherwise enters the payment instrument 143 at a transaction client 145 (FIG. 1). The transaction client 145 generates a charge request 147 (FIG. 1) that includes the account code 119 (FIG. 1) obtained from the payment instrument 143 and sends the same to the verification application 126c. In box 237, the verification application 126c receives the charge request 147 from the transaction client 145 and obtains the account code 119 (FIG. 1) therefrom.

Next, the verification application 126c moves to box 240 and generates a location request. In box 241, the verification application 126c then sends the location request to the client 106 (FIG. 1). An appropriate application in the client 106 is configured to generate the location of the client 106 and send the same to the verification application 126c in response to the location request. In box 242, the verification application 126c receives the response from the client 106 indicating the location of the client 106. Upon receipt, the verification application 126c moves to box 245 and determines if the location of the client 106 is in relative close proximity to the location of origin of the charge request 147. This may be determined, for example, by ascertaining whether the client 106 is within a predefined distance of a location of the transaction client 145. The location of the transaction client 145 may be included in the charge request 147 from the transaction client 145.

Assuming the location of the client 106 and the location of origin of the charge request 147 are within an acceptable distance from each other, the verification application 126c moves to box 257 and approves charging of the user account 116 (FIG. 1). Otherwise, the verification application 126c moves to box 256 and denies the charge request 147. In one embodiment, the verification application 126c calculates the distance between the location of origin listed in the charge request 147 and the location of the client 106. As a non-limiting example, a user may specify a predefined distance that ranges from a few feet to 100 meters or other distances. If the distance between the location of origin of the charge request 147 and the location of the client 106 falls within the predefined distance, then the verification application 126c proceeds to box 257 as described above.

In another embodiment, a user who employs a payment instrument 143 needs to be within a predefined distance of a predefined point of interest other than the location of the transaction client 145. Such point of interest may comprise, for example, a home location, a work location, and/or any other location. As an example, upon receipt of the location of the client 106, the verification application 126c may determine whether the location of the client 106 is within a predefined distance of the point of interest specified. For example, a user employing a client 106 specifies a home location as the predefined point of interest. A user employing a client 106 then facilitates an online purchase at the home location via the transaction client 145. The transaction client 145 generates a charge request 147 and sends the charge request to the verification application 126c. The verification application 126c then generates a location request and sends the location request to the client 106. An appropriate application in the client 106 is configured to generate the location of the client 106 and send the same to the verification application 126c in response to the location request. In box 242, the verification application 126c receives the response from the client 106 indicating the location of the client 106. Upon receipt, the verification application 126c moves to box 245 and determines if the location of the client 106 is in relative close proximity to the location of origin of the charge request 147. Assuming the location of the client 106 is located near the point of interest specified, the verification application 126c proceeds to box 257 as described above. Otherwise, the verification application 126c moves to box 256 and denies charging the user account 116 associated with the payment instrument 143. Thereafter, the verification application 126c ends.

Figure 3:
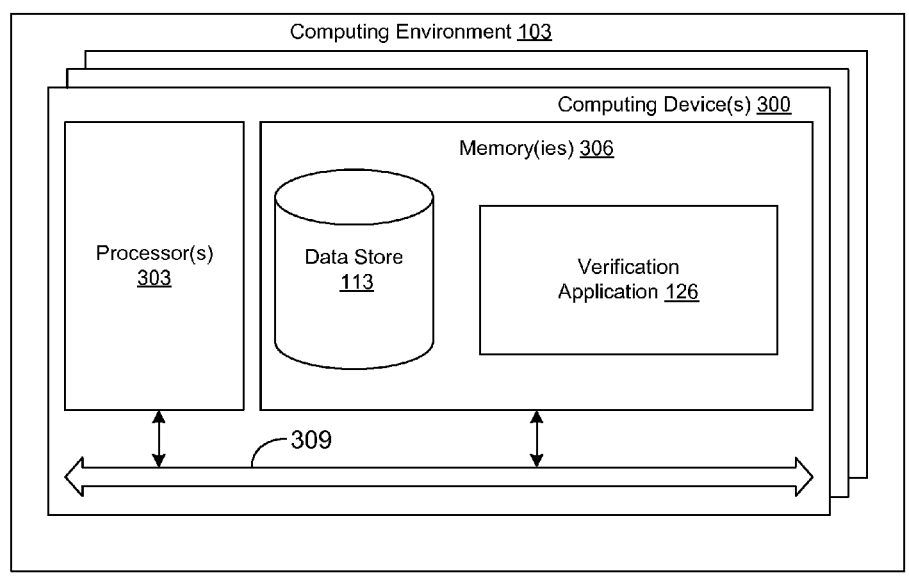
FIG. 3 is a schematic block diagram that provides one example illustration of a computing environment employed in the networked environment of FIG. 1 according to various embodiments of the present disclosure.

With reference to FIG. 3, shown is a schematic block diagram of the computing environment 103 according to an embodiment of the present disclosure. The computing environment 103 includes one or more computing devices 300. The computing device 300 includes at least one processor circuit, for example, having a processor 303 and a memory 306, both of which are coupled to a local interface 309. To this end, the computing environment 103 may comprise, for example, at least one server computer or like device. The local interface 309 may comprise, for example, a data bus with an accompanying address/control bus or other bus structure as can be appreciated.

Stored in the memory 306 are both data and several components that are executable by the processor 303. In particular, stored in the memory 306 and executable by the processor 303 are verification application 126 and potentially other applications. Also stored in the memory 306 may be a data store 113 and other data. In addition, an operating system may be stored in the memory 306 and executable by the processor 303.

It is understood that there may be other applications that are stored in the memory 306 and are executable by the processors 303 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as including both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors 303 and the memory 306 may represent multiple memories 306 that operate in parallel processing circuits, respectively. In such a case, the local interface 309 may be an appropriate network 109 (FIG. 1) that facilitates communication between any two of the multiple processors 303, between any processor 303 and any of the memories 306, or between any two of the memories 306, etc. The local interface 309 may comprise additional systems designed to coordinate this communication, including, for example, performing load balancing. The processor 303 may be of electrical or of some other available construction.

Although verification application 126, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2A-2C shows the functionality and operation of an implementation of portions of the verification application. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 303 in a computer system or other system. The machine code may be converted from the source code, etc. If embodied in hardware, each block may represent a circuit or a number of interconnected circuits to implement the specified logical function(s).

Although the flowcharts of FIGS. 2A-2C shows a specific order of execution, it is understood that the order of execution may differ from that which is depicted. For example, the order of execution of two or more blocks may be scrambled relative to the order shown. Also, two or more blocks shown in succession in FIGS. 2A-2C may be executed concurrently or with partial concurrence. Further, in some embodiments, one or more of the blocks shown in FIGS. 2A-2C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including verification application 126, that comprises software or code can be embodied in any non-transitory computer-readable medium for use by or in connection with an instruction execution system such as, for example, a processor 303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that maintains an account in at least one memory accessible to the computing device, the at least one memory having stored thereon a first account code and a first verification code, wherein both the first account code and the first verification code are associated with the account; and
   code that, in response to receiving a charge request containing a second account code and a second verification code, determines whether to approve the charge request based at least in part on whether the second account code matches the first account code, the second verification code matches the first verification code, and the second verification code is received within a predefined amount of time, wherein the account is associated with a payment instrument, the payment instrument comprising a first near field communication device that embodies the second account code that is read by a transaction client, the second verification code originating from a second near field communication device that is read by the transaction client.

2. The non-transitory computer-readable medium of claim 1, wherein the second account code and the second verification code are obtained at a single transaction client.

3. The non-transitory computer-readable medium of claim 1, wherein the second near field communication device is embedded in a mobile device.

4. A system, comprising:
   at least one computing device;
   at least one memory accessible by the at least one computing device, the at least one memory having stored thereon a first account code, a first verification code, and a verification application; and
   the verification application executable in the at least one computing device, the verification application comprising:
      logic that obtains a second account code from a charge request received from a transaction client, wherein the second account code is obtained by reading a first near field communication device that embodies the second account code at the transaction client, the second account code being associated with a payment instrument that includes the first near field communication device;
      logic that obtains a second verification code, wherein the second verification code is associated with a second near field communication device; and
      logic that determines whether to approve charging an account associated with the charge request received from the transaction client based at least upon whether the first account code matches the second account code, and the first verification code matches the second verification code.

5. The system of claim 4, wherein the second account code and the second verification code are obtained in a single location.

6. The system of claim 4, wherein the second near field communication device is implanted in a user associated with the payment instrument.

7. The system of claim 4, wherein the second near field communication device is embedded in a mobile device.

8. The system of claim 4, wherein the logic that determines whether to approve charging the account further comprises logic that determines whether the second verification code is received within a predefined amount of time.

9. The system of claim 4, wherein the second account code and the second verification code are obtained while the transaction client and the second near field communication device are within a predefined distance from each other.

10. The system of claim 4, wherein the second account code and the second verification code are obtained through the transaction client contemporaneously with respect to each other.

11. The system of claim 4, wherein the logic that determines whether to approve charging the account further comprises logic that sends an electronic message to a client, and wherein the electronic message comprises a query for the second verification code.

12. The system of claim 11, wherein the logic that determines whether to approve charging the account further comprises logic that determines whether to approve charging the account based on whether the second verification code received from the client matches the first verification code.

13. The system of claim 11, wherein the electronic message further comprises a short message service text message.

14. The system of claim 11, wherein the electronic message further comprises an email message.

15. The system of claim 4, wherein the verification application further comprises logic that generates a dynamic pin code for display in at least one user interface on a client.

16. The system of claim 15, wherein the logic that determines whether to approve charging the account further comprises logic that determines whether to approve charging the account based on receipt of the dynamic pin code received from the client.

17. A method, comprising:
   storing, using at least one of one or more computing devices, a first account code and a first verification code in at least one memory;
   obtaining, using at least one of the one or more computing devices, a second account code from a charge request received from a transaction client, wherein the second account code is obtained by reading a first near field communication device that embodies the second account code at the transaction client, the second account code being associated with a payment instrument that includes the first near field communication device;
   obtaining, using at least one of the one or more computing devices, a second verification code, wherein the second verification code is associated with a second near field communication device; and
   determining, using at least one of the one or more computing devices, whether to approve charging an account associated with the charge request received from the transaction client based at least in part upon whether the first account code matches the second account code, and the first verification code matches the second verification code.

18. The method of claim 17, wherein the second near field communication device is embedded in a card, a ring, or an accessory associated with a user of the payment instrument.

19. The method of claim 17, further comprising transmitting an electronic message to a client, wherein the electronic message comprises a query for the second verification code.

20. The method of claim 17, wherein the second account code and the second verification code are obtained in a single location.

* * * * *